US008597138B2

(12) United States Patent
Liu et al.

(10) Patent No.: US 8,597,138 B2
(45) Date of Patent: *Dec. 3, 2013

(54) METHOD FOR SURFACE TREATING A GOLF CLUB HEAD

(75) Inventors: Chih-Lung Liu, Kaohsiung (TW); Chin-Chun Tseng, Kaohsiung Hsien (TW); Jiann-Hsing Chuang, Kaohsiung (TW); Sharon J. Park, Irvine, CA (US); Daniel J. Stone, Long Beach, CA (US)

(73) Assignee: SRI Sports Limited, Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,555

(22) Filed: Aug. 13, 2012

(65) Prior Publication Data

US 2012/0304451 A1 Dec. 6, 2012

Related U.S. Application Data

(63) Continuation of application No. 12/627,568, filed on Nov. 30, 2009, now Pat. No. 8,262,504, which is a continuation of application No. 11/643,666, filed on Dec. 22, 2006, now Pat. No. 7,662,049.

(30) Foreign Application Priority Data

Sep. 22, 2006 (TW) .............................. 95135155 A

(51) Int. Cl.
*A63B 53/04* (2006.01)

(52) U.S. Cl.
USPC .......................................... 473/331; 473/342

(58) Field of Classification Search
USPC .................................. 473/324–350
See application file for complete search history.

(56) References Cited

U.S. PATENT DOCUMENTS

| 1,965,954 A | 7/1934 | Davis |
| 2,520,950 A | 9/1950 | Miller |
| 2,926,913 A | 3/1960 | Stecher |

(Continued)

FOREIGN PATENT DOCUMENTS

| JP | B-7-3006522 | 1/1973 |
| JP | B-73-006522 | 1/1973 |

(Continued)

OTHER PUBLICATIONS

Erik J. Barzeski, "Vokey Spin Milled Wedge Review," The Sand Trap.com, Jul. 12, 2005, http://thesandtrap.com/clubs/vokey_spin_milled_wedge_review.

(Continued)

*Primary Examiner* — Alvin Hunter
(74) *Attorney, Agent, or Firm* — Oliff & Berridge, PLC

(57) ABSTRACT

A method for surface treating a golf club head, includes: (a) forming a depression unit in the golf club head, the depression unit being indented inwardly from an outer surface of the golf club head, the outer surface being divided into a working area and a non-working area, the depression unit being formed in the working area; (b) filling the depression unit with a shielding material and covering the non-working area with a covering material; and (c) sandblasting the golf club head after step (b) and removing subsequently the shielding material from the depression unit and the covering material from the non-working area so as to form the working area into sandblasted and non-sandblasted regions that differ in gloss intensity.

14 Claims, 4 Drawing Sheets

(56) References Cited

U.S. PATENT DOCUMENTS

| | | |
|---|---|---|
| 4,430,416 A | 2/1984 | Goto et al. |
| 4,529,203 A | 7/1985 | Ribaudo |
| 4,610,581 A | 9/1986 | Heinlein |
| 4,754,971 A | 7/1988 | Kobayashi |
| 4,792,140 A | 12/1988 | Yamaguchi et al. |
| 4,801,490 A | 1/1989 | Schuette |
| 4,917,384 A | 4/1990 | Caicati |
| 5,127,675 A | 7/1992 | Moss |
| 5,190,289 A | 3/1993 | Nagai et al. |
| 5,358,249 A | 10/1994 | Mendralla |
| 5,437,088 A | 8/1995 | Igarashi |
| 5,472,201 A | 12/1995 | Aizawa et al. |
| 5,484,155 A | 1/1996 | Yamawaki et al. |
| 5,601,501 A | 2/1997 | Kobayashi |
| 5,611,742 A | 3/1997 | Kobayashi |
| 5,665,013 A | 9/1997 | Kobayashi |
| 5,674,132 A | 10/1997 | Fisher |
| 5,676,605 A | 10/1997 | Kobayashi |
| 5,688,186 A | 11/1997 | Michaels et al. |
| 5,735,755 A | 4/1998 | Kobayashi |
| 5,804,272 A | 9/1998 | Schrader |
| 5,958,170 A | 9/1999 | Cetrangolo |
| 6,187,849 B1 | 2/2001 | Nugent et al. |
| 6,193,614 B1 | 2/2001 | Sasamoto et al. |
| 6,346,052 B1 | 2/2002 | Chappell |
| 6,402,636 B1 | 6/2002 | Chang |
| 6,402,637 B1 | 6/2002 | Sasamoto et al. |
| 6,475,099 B1 | 11/2002 | Sumitomo et al. |
| 6,713,717 B2 | 3/2004 | Takeda |
| 6,719,644 B2 | 4/2004 | Beach |
| 6,916,253 B2 | 7/2005 | Takeda |
| 6,945,307 B2 | 9/2005 | Tsai |
| 6,981,923 B2 | 1/2006 | Chappell |
| 7,040,000 B2 | 5/2006 | Takeda |
| 7,080,560 B2 | 7/2006 | Takizawa et al. |
| 7,258,627 B2 | 8/2007 | Chappell |
| 7,568,983 B2 | 8/2009 | Gilbert |
| 7,662,049 B2 * | 2/2010 | Park et al. .................... 473/330 |
| 7,780,549 B2 | 8/2010 | Park et al. |
| 2003/0032498 A1 | 2/2003 | Erb et al. |
| 2004/0127300 A1 | 7/2004 | Roesgen et al. |
| 2004/0192465 A1 | 9/2004 | Erb et al. |
| 2005/0130761 A1 | 6/2005 | Vokey et al. |
| 2006/0025233 A1 | 2/2006 | Lin |
| 2007/0010346 A1 | 1/2007 | Gilbert et al. |
| 2007/0149312 A1 | 6/2007 | Gilbert |
| 2008/0076594 A1 | 3/2008 | Liu et al. |
| 2008/0132351 A1 | 6/2008 | Ban et al. |

FOREIGN PATENT DOCUMENTS

| | | |
|---|---|---|
| JP | A-02-0234777 | 9/1990 |
| JP | A-10-248974 | 9/1998 |
| JP | A-10-277185 | 10/1998 |
| JP | A-2003-190335 | 7/2003 |
| JP | A-2003-293198 | 10/2003 |
| JP | A-2004-277811 | 10/2004 |
| JP | A-2007-325859 | 12/2007 |

OTHER PUBLICATIONS

U.S. Patent and Trademark Office Rejection, mailed Sep. 21, 2009 in U.S. Appl. No. 11/907,903.
Dec. 2, 2011 Office Action issued in U.S. Appl. No. 12/838,090.
Jul. 24, 2008 Office Action issued in U.S. Appl. No. 11/643,666.
Feb. 23, 2009 Office Action issued in U.S. Appl. No. 11/643,666.
Jul. 10, 2009 Office Action issued in U.S. Appl. No. 11/643,666.
Oct. 22, 2009 Notice of Allowance issued in U.S. Appl. No. 11/643,666.
Sep. 21, 2009 Office Action issued in U.S. Appl. No. 11/907,903.
Dec. 28, 2009 Office Action issued in U.S. Appl. No. 11/907,903.
Jul. 16, 2010 Notice of Allowance issued in U.S. Appl. No. 11/907,903.
May 11, 2012 Notice of Allowance issued in U.S. Appl. No. 12/627,568.

* cited by examiner

METHOD FOR SURFACE TREATING A GOLF CLUB HEAD

CROSS-REFERENCE TO RELATED APPLICATION

This application is a continuation application of U.S. patent application Ser. No. 12/627,568 which is a continuation application of U.S. patent application Ser. No. 11/643,666, filed Dec. 22, 2006 (now U.S. Pat. No. 7,662,049 issued Feb. 16, 2010), which claims priority to Taiwanese Application No. 095135155, filed on Sep. 22, 2006, the contents of both of which are hereby incorporated by reference in their entireties.

BACKGROUND OF THE INVENTION

1. Field of the Invention

The invention relates to a method for surface treating a golf club head, more particularly to a method for forming an outer surface of a golf club head into regions that differ in gloss intensity.

2. Description of the Related Art

Conventional methods for enhancing the attractiveness of the outer surface of a golf club head include techniques, such as painting, plating, and physical vapor deposition. However, these conventional methods have a relatively high processing cost and a relatively low production yield due to their tendency of forming uneven gloss intensity on the outer surface of the golf club head.

SUMMARY OF THE INVENTION

Therefore, the object of the present invention is to provide a method for treating a surface of a golf club head that can overcome the aforesaid drawbacks associated with the prior art.

Accordingly, a method of this invention for surface treating a golf club head comprises: (a) forming a depression unit in the golf club head, the depression unit being indented inwardly from an outer surface of the golf club head, the outer surface being divided into a working area and a non-working area, the depression unit being formed in the working area; (b) filling the depression unit with a shielding material and covering the non-working area with a covering material; and (c) sandblasting the golf club head after step (b) and removing subsequently the shielding material from the depression unit and the covering material from the non-working area so as to form the working area into sandblasted and non-sandblasted regions that differ in gloss intensity.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
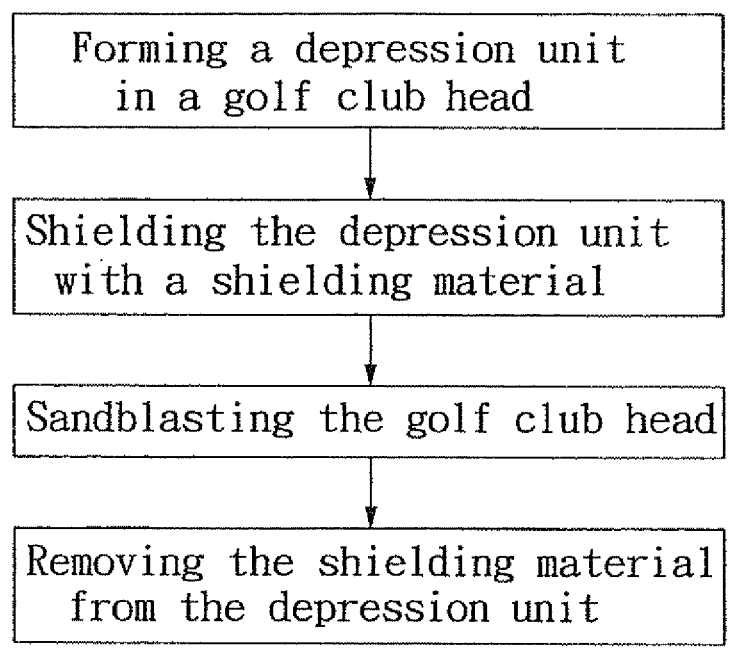
FIG. 1 is a flow chart illustrating consecutive steps of the preferred embodiment of a method according to the present invention for surface treating a golf club head.
Figure 2:
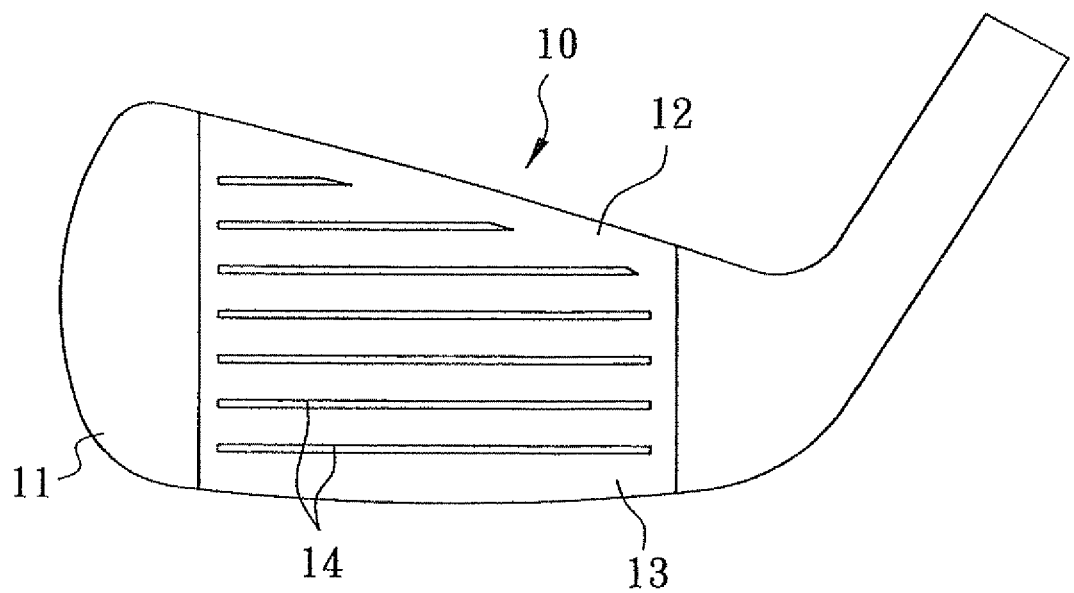
FIG. 2 is a schematic view of a golf club head in an initial state before being surface treated.
Figure 3:
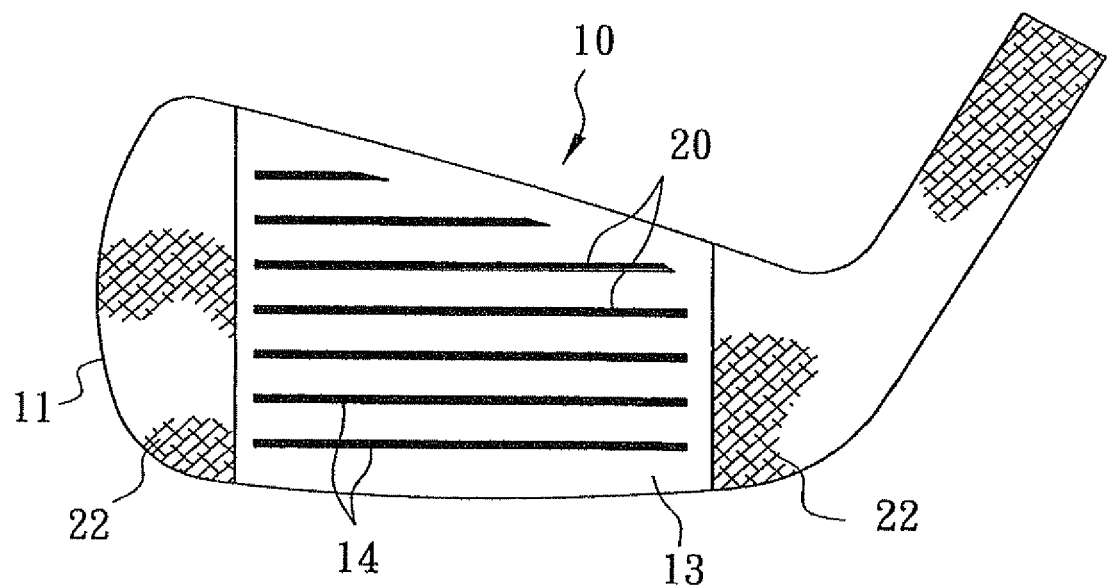
FIG. 3 is a schematic view of the golf club head in a state where a depression unit in the golf club head is shielded with a shielding material according to the preferred embodiment of this invention.
Figure 4:
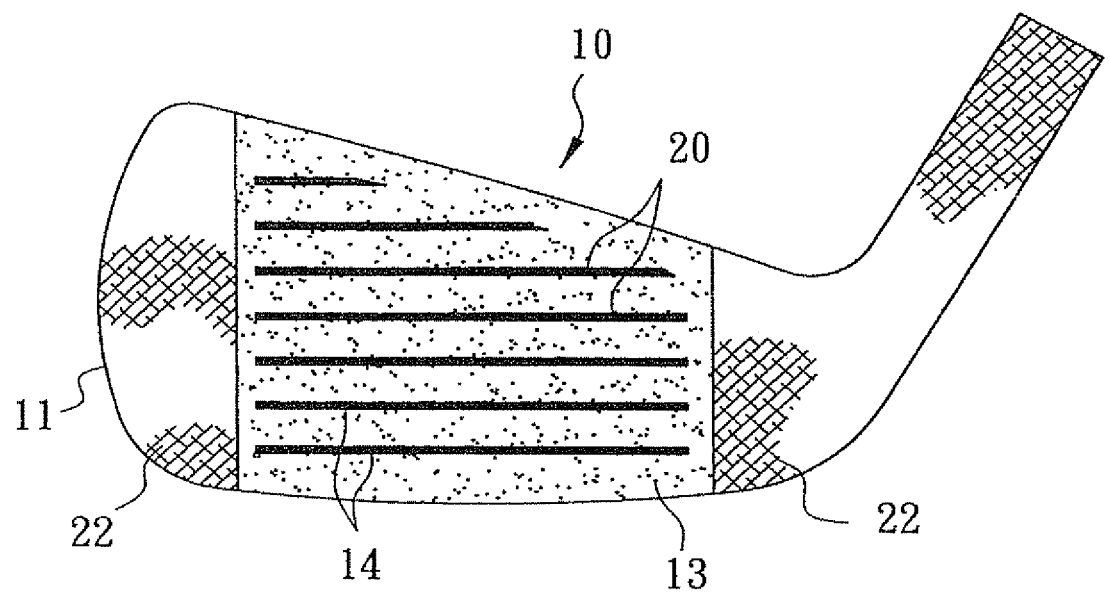
FIG. 4 is a schematic view of the golf club head in a state where a working area of an outer surface of the golf club head surrounding the depression unit is sandblasted according to the preferred embodiment of this invention.
Figure 5:
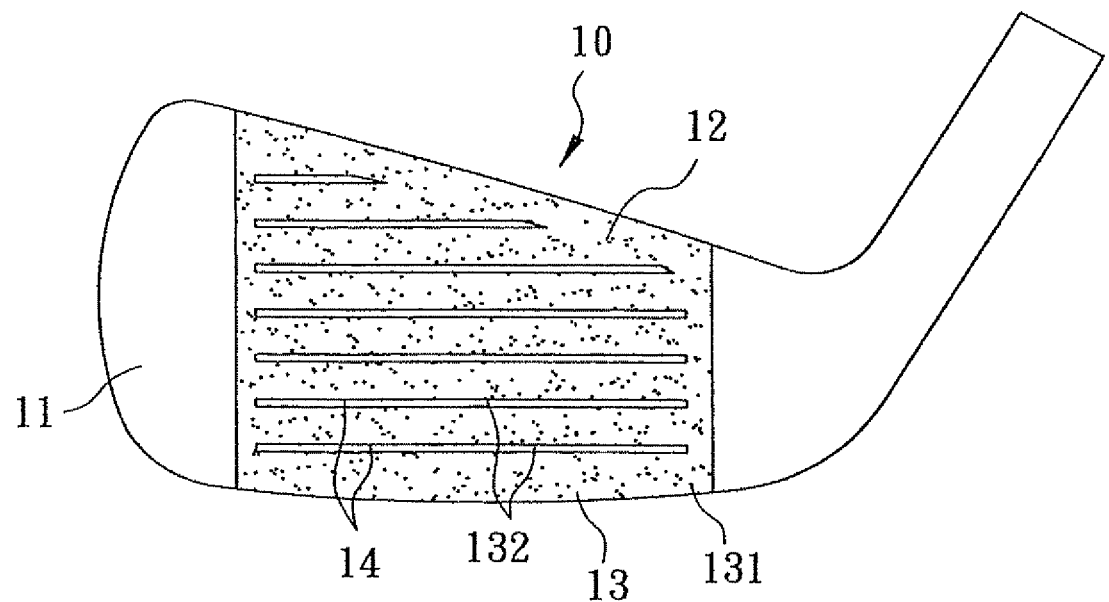
FIG. 5 is a schematic view of the golf club head in a state where the shielding material is removed after the working area of the outer surface of the golf club head is sandblasted according to the preferred embodiment of this invention.

FIG. 1 is a flow chart illustrating consecutive steps of the preferred embodiment of a method according to the present invention for surface treating a golf club head 10 (see FIG. 2). The method includes the steps of: (a) forming a depression unit 14 in the golf club head 10 (see FIG. 2), the depression unit 14 being indented inwardly from an outer surface 12 of the golf club head 10, the outer surface 12 of the golf club head 10 being divided into a working area 13 and a non-working area 11, the depression unit 14 being formed in the working area 13; (b) filling the depression unit 14 with a shielding material 20 and covering the non-working area 11 with a covering material 22 (see FIG. 3); and (c) sandblasting the golf club head 10 after step (b) (see FIG. 4) and removing subsequently the shielding material 20 from the depression unit 14 and the covering material 22 from the non-working area 11 (see FIG. 5) so as to form the working area 13 of the outer surface 12 into sandblasted and non-sandblasted regions 131, 132 that differ in gloss intensity.

Particularly, in this preferred embodiment, the method further includes polishing, plating, and anti-corrosion treating the outer surface 12 of the golf club head 10 before step (a) or after step (a) but before step (b). The depression unit 14 can be formed by carving techniques or by molding techniques.

The shielding material 20 is preferably selected from the group consisting of waxes, silicones, resins, gypsum, paints, and plastics. In this preferred embodiment, the shielding material 20 is a wax having a melting point ranging from 40 to 60° C.

The covering material is preferably a plastic sheet that can easily wrap around the non-working area 11 of the outer surface 12 of the golf club head 10.

In this preferred embodiment, the working area 13 to be sandblasted is the surface of a striking plate of the golf club head 10. The depression unit 14 is in the form of parallel line-shaped grooves.

During the shielding operation, a sufficient amount of wax is melted so as to fill the depression unit 14, and is subsequently cooled to become solidified.

When wax is used as the shielding material 20, removal of the shielding material 20 from the depression unit 14 can be conducted using a cleaning agent selected from the group consisting of dichloromethane, trichloromethane, chloroform, acetone, pentane, and pentanone. Preferably, the cleaning agent suitable for removing the shielding material 20 is dichloromethane. In addition, the cleaning operation is preferably conducted using a ultrasound cleaning equipment.

Figure 6:
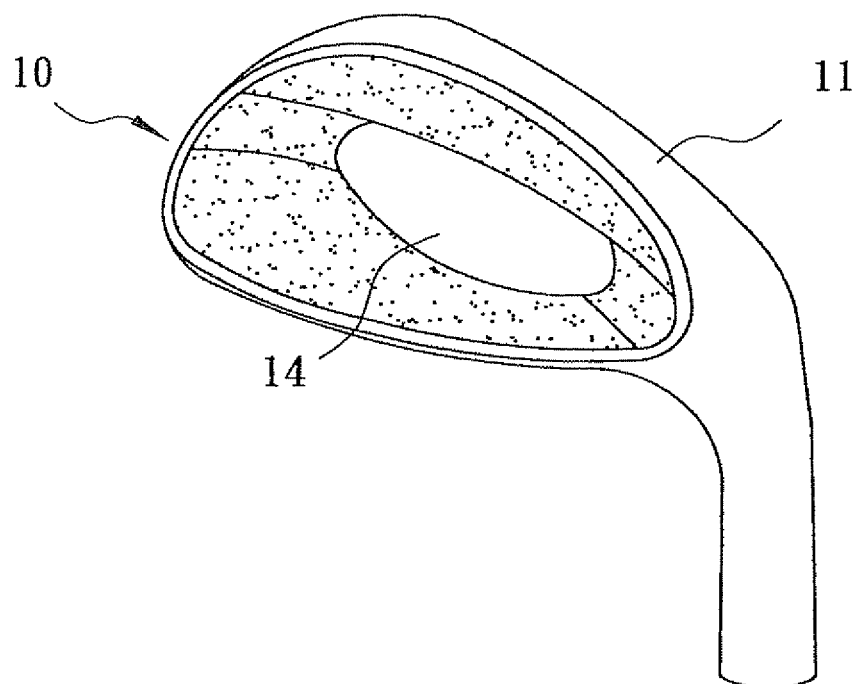
FIGS. 6 and 7 are schematic views illustrating different patterns of the depression unit formed on the working area of the outer surface of the golf club head according to the preferred embodiment of this invention.
Figure 7:
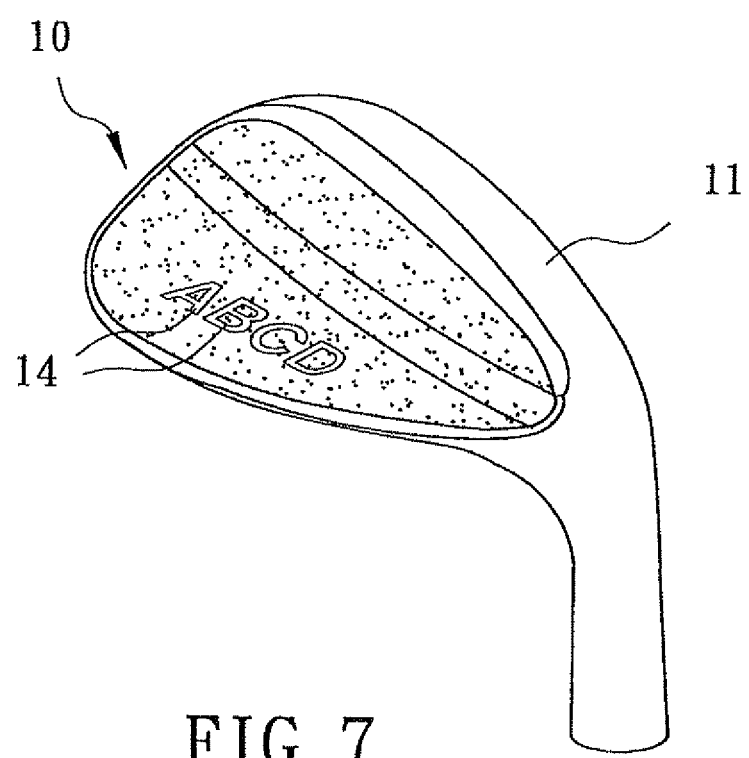

FIGS. 6 and 7 illustrate different patterns of the depression unit 14 formed on the working area 13 of the outer surface 12 of the golf club head 10 according to the preferred embodiment of this invention. In FIG. 6, the depression unit 14 is in the form of a back cavity in the golf club head 10. In FIG. 7, the depression unit 14 is in the form of English characters.

With the inclusion of the sandblasting techniques in the method of this invention for surface treating the golf club head 10, the aforesaid drawbacks associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of manufacturing a golf club head, the method comprising:
    forming a depression unit in an area of the golf club bead;
    filling the depression unit with a shielding material;
    sandblasting the golf club head including the area with the depression unit filled with the shielding material such that the shielding material protects the depression unit from the sandblasting and the sandblasting forms a sandblasted region; and
    removing the shielding material from the depression unit, wherein, after the removal of the shielding material, the depression unit includes no shielding material and a non-sandblasted region that differs in gloss intensity from the sandblasted region.

2. The method of claim 1, further comprising:
    polishing the golf club head prior to formation of the depression unit.

3. The method of claim 1, further comprising:
    polishing the golf club head after formation of the depression unit but prior to filling the depression unit with shielding material.

4. The method of claim 1, further comprising:
    plating the golf club head prior to formation of the depression unit.

5. The method of claim 1, further comprising:
    plating the golf club head after formation of the depression unit but prior to filling the depression unit with shielding material.

6. The method of claim 1, further comprising:
    applying an anti-corrosion treatment to the golf club head prior to formation of the depression unit.

7. The method of claim 1, further comprising:
    applying an anti-corrosion treatment to the golf club head after formation of the depression unit but prior to filling the depression unit with shielding material.

8. A method of manufacturing a golf club head, the method comprising:
    forming a depression unit within a working area of the golf club head, the working area being positioned adjacent a non-working area;
    protecting a first region corresponding to the depression unit from a sandblasting operation via a first material of protection; and
    performing the sandblasting operation on the golf club head including the working area resulting in a sandblasted region surrounding the first region protected from the sandblasting,
    wherein the sandblasting operation creates a variance in gloss intensity between the sandblasted region and the first region when the first material of protection is removed.

9. The method of claim 8, wherein protecting the first region from the sandblasting operation includes filling the depression unit with the first material of protection.

10. The method of claim 9, wherein the first material of protection is selected from a group consisting of wax, silicon, resin, gypsum, paint and plastic.

11. The method of claim 9, wherein the first material of protection is wax.

12. The method of manufacturing of claim 8, further comprising:
    protecting a second region within the non-working area from the sandblasting operation via a second material of protection.

13. The method of claim 12, wherein protecting the second region from the sandblasting operation includes wrapping the second region with the second material of protection.

14. The method of claim 12, wherein the second material of protection is a plastic.

* * * * *